United States Patent
Toyama (10) Patent No.: US 10,163,021 B2
(45) Date of Patent: Dec. 25, 2018

(54) INFORMATION PROCESSOR, CONTENT DETERMINING METHOD, AND COMPUTER-READABLE STORING MEDIUM

(71) Applicant: CASIO COMPUTER CO., LTD., Shibuya-ku, Tokyo (JP)

(72) Inventor: Chihiro Toyama, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 4 days.

(21) Appl. No.: 15/014,936

(22) Filed: Feb. 3, 2016

(65) Prior Publication Data

US 2016/0277701 A1 Sep. 22, 2016

(30) Foreign Application Priority Data

Mar. 18, 2015 (JP) ................. 2015-054421

(51) Int. Cl.
| | | |
|---|---|---|
| *G06K 9/03* | (2006.01) | |
| *G06K 9/00* | (2006.01) | |
| *G06Q 30/02* | (2012.01) | |
| *G09F 27/00* | (2006.01) | |
| *H04N 5/44* | (2011.01) | |
| *H04N 21/43* | (2011.01) | |
| *H04N 21/433* | (2011.01) | |
| *H04N 21/441* | (2011.01) | |
| *H04N 21/442* | (2011.01) | |

(52) U.S. Cl.
CPC ......... *G06K 9/036* (2013.01); *G06K 9/00255* (2013.01); *G06Q 30/0269* (2013.01); *G09F 27/00* (2013.01); *H04N 5/44* (2013.01); *H04N 21/43* (2013.01); *H04N 21/4334* (2013.01); *H04N 21/441* (2013.01); *H04N 21/44218* (2013.01); *G06K 2009/00322* (2013.01)

(58) Field of Classification Search
CPC ...... H04N 5/50; G06K 9/036; G06K 9/00255; G06K 2009/00322
USPC .......................................................... 348/553
See application file for complete search history.

(56) References Cited

U.S. PATENT DOCUMENTS

| | | | | |
|---|---|---|---|---|
| 2011/0083148 A1* | 4/2011 | Sakaguchi | ......... | H04N 5/44543 725/39 |
| 2012/0081568 A1* | 4/2012 | Suzuki | .................... | G06T 19/20 348/222.1 |

(Continued)

FOREIGN PATENT DOCUMENTS

| | | |
|---|---|---|
| JP | 2011123657 A | 6/2011 |
| JP | 2011150221 A | 8/2011 |
| JP | 2012053813 A | 3/2012 |

OTHER PUBLICATIONS

Japanese Office Action (and English language translation thereof) dated Oct. 2, 2018 issued in Japanese Application No. 2015-054421.

*Primary Examiner* — Jefferey F Harold
*Assistant Examiner* — Omer Khalid
(74) *Attorney, Agent, or Firm* — Holtz, Holtz & Volek PC (57) ABSTRACT

An information processor includes a recognition section that recognizes a feature of a viewer of content, an acquisition section that acquires a recognition error that occurs when the feature of the viewer is recognized by the recognition section, and a determination section that determines content to be output, on the basis of the acquired recognition error.

8 Claims, 6 Drawing Sheets

| DISTANCE FROM THE VIEWER | FARTHER | FAR | CLOSE |
|---|---|---|---|
| GENDER RECOGNITION ACCURACY | LOW | MEDIUM | HIGH |
| AGE RECOGNITION ERROR | ±15 | ±10 | ±5 |

(56) References Cited

U.S. PATENT DOCUMENTS

2015/0138327 A1* 5/2015 Xu ................. H04N 13/356
 348/54
2015/0146071 A1* 5/2015 Yi .................. H04N 21/41407
 348/333.02

* cited by examiner

| CONTENT ITEMS WHEN "DISTANCE = FARTHER" |
|---|
| "COMMODITY PROFILE (A)" FOR 5±15 YEARS OLD (MALE AND FEMALE) |
| "COMMODITY PROFILE (A)" FOR 10±15 YEARS OLD (MALE AND FEMALE) |
| "COMMODITY PROFILE (A)" FOR 15±15 YEARS OLD (MALE AND FEMALE) |
| "COMMODITY PROFILE (A)" FOR 20±15 YEARS OLD (MALE AND FEMALE) |
| "COMMODITY PROFILE (A)" FOR 25±15 YEARS OLD (MALE AND FEMALE) |
| "COMMODITY PROFILE (A)" FOR 30±15 YEARS OLD (MALE AND FEMALE) |
| "COMMODITY PROFILE (A)" FOR 35±15 YEARS OLD (MALE AND FEMALE) |
| "COMMODITY PROFILE (A)" FOR 40±15 YEARS OLD (MALE AND FEMALE) |
| "COMMODITY PROFILE (A)" FOR 45±15 YEARS OLD (MALE AND FEMALE) |
| "COMMODITY PROFILE (A)" FOR 50±15 YEARS OLD (MALE AND FEMALE) |
| "COMMODITY PROFILE (A)" FOR 55±15 YEARS OLD (MALE AND FEMALE) |
| "COMMODITY PROFILE (A)" FOR 60±15 YEARS OLD (MALE AND FEMALE) |
| "COMMODITY PROFILE (A)" FOR 65±15 YEARS OLD (MALE AND FEMALE) |
| "COMMODITY PROFILE (A)" FOR 70±15 YEARS OLD (MALE AND FEMALE) |
| "COMMODITY PROFILE (A)" FOR 75±15 YEARS OLD (MALE AND FEMALE) |
| "COMMODITY PROFILE (A)" FOR 80±15 YEARS OLD (MALE AND FEMALE) |

| CONTENT ITEMS WHEN "DISTANCE = FAR" |
|---|
| "COMMODITY PROFILE (B)" FOR 5±10 YEARS OLD (FEMALE) |
| "COMMODITY PROFILE (B)" FOR 10±10 YEARS OLD (FEMALE) |
| "COMMODITY PROFILE (B)" FOR 15±10 YEARS OLD (FEMALE) |
| "COMMODITY PROFILE (B)" FOR 20±10 YEARS OLD (FEMALE) |
| "COMMODITY PROFILE (B)" FOR 25±10 YEARS OLD (FEMALE) |
| "COMMODITY PROFILE (B)" FOR 30±10 YEARS OLD (FEMALE) |
| "COMMODITY PROFILE (B)" FOR 35±10 YEARS OLD (FEMALE) |
| "COMMODITY PROFILE (B)" FOR 40±10 YEARS OLD (FEMALE) |
| "COMMODITY PROFILE (B)" FOR 45±10 YEARS OLD (FEMALE) |
| "COMMODITY PROFILE (B)" FOR 50±10 YEARS OLD (FEMALE) |
| "COMMODITY PROFILE (B)" FOR 55±10 YEARS OLD (FEMALE) |
| "COMMODITY PROFILE (B)" FOR 60±10 YEARS OLD (FEMALE) |
| "COMMODITY PROFILE (B)" FOR 65±10 YEARS OLD (FEMALE) |
| "COMMODITY PROFILE (B)" FOR 70±10 YEARS OLD (FEMALE) |
| "COMMODITY PROFILE (B)" FOR 75±10 YEARS OLD (FEMALE) |
| "COMMODITY PROFILE (B)" FOR 80±10 YEARS OLD (FEMALE) |
| "COMMODITY PROFILE (B)" FOR 5±10 YEARS OLD (MALE) |
| "COMMODITY PROFILE (B)" FOR 10±10 YEARS OLD (MALE) |
| "COMMODITY PROFILE (B)" FOR 15±10 YEARS OLD (MALE) |
| "COMMODITY PROFILE (B)" FOR 20±10 YEARS OLD (MALE) |
| "COMMODITY PROFILE (B)" FOR 25±10 YEARS OLD (MALE) |
| "COMMODITY PROFILE (B)" FOR 30±10 YEARS OLD (MALE) |
| "COMMODITY PROFILE (B)" FOR 35±10 YEARS OLD (MALE) |
| "COMMODITY PROFILE (B)" FOR 40±10 YEARS OLD (MALE) |
| "COMMODITY PROFILE (B)" FOR 45±10 YEARS OLD (MALE) |
| "COMMODITY PROFILE (B)" FOR 50±10 YEARS OLD (MALE) |
| "COMMODITY PROFILE (B)" FOR 55±10 YEARS OLD (MALE) |
| "COMMODITY PROFILE (B)" FOR 60±10 YEARS OLD (MALE) |
| "COMMODITY PROFILE (B)" FOR 65±10 YEARS OLD (MALE) |
| "COMMODITY PROFILE (B)" FOR 70±10 YEARS OLD (MALE) |
| "COMMODITY PROFILE (B)" FOR 75±10 YEARS OLD (MALE) |
| "COMMODITY PROFILE (B)" FOR 80±10 YEARS OLD (MALE) |

FIG. 5B

| CONTENT ITEMS WHEN "DISTANCE = CLOSE" | CONTENT ITEMS WHEN "DISTANCE = CLOSE" |
|---|---|
| "FUNCTIONAL DESCRIPTION (A)" FOR 5 ±5 YEARS OLD (FEMALE) | "FUNCTIONAL DESCRIPTION (B)" FOR 5 ±5 YEARS OLD (FEMALE) |
| "FUNCTIONAL DESCRIPTION (A)" FOR 10 ±5 YEARS OLD (FEMALE) | "FUNCTIONAL DESCRIPTION (B)" FOR 10 ±5 YEARS OLD (FEMALE) |
| "FUNCTIONAL DESCRIPTION (A)" FOR 15 ±5 YEARS OLD (FEMALE) | "FUNCTIONAL DESCRIPTION (B)" FOR 15 ±5 YEARS OLD (FEMALE) |
| "FUNCTIONAL DESCRIPTION (A)" FOR 20 ±5 YEARS OLD (FEMALE) | "FUNCTIONAL DESCRIPTION (B)" FOR 20 ±5 YEARS OLD (FEMALE) |
| "FUNCTIONAL DESCRIPTION (A)" FOR 25 ±5 YEARS OLD (FEMALE) | "FUNCTIONAL DESCRIPTION (B)" FOR 25 ±5 YEARS OLD (FEMALE) |
| "FUNCTIONAL DESCRIPTION (A)" FOR 30 ±5 YEARS OLD (FEMALE) | "FUNCTIONAL DESCRIPTION (B)" FOR 30 ±5 YEARS OLD (FEMALE) |
| "FUNCTIONAL DESCRIPTION (A)" FOR 35 ±5 YEARS OLD (FEMALE) | "FUNCTIONAL DESCRIPTION (B)" FOR 35 ±5 YEARS OLD (FEMALE) |
| "FUNCTIONAL DESCRIPTION (A)" FOR 40 ±5 YEARS OLD (FEMALE) | "FUNCTIONAL DESCRIPTION (B)" FOR 40 ±5 YEARS OLD (FEMALE) |
| "FUNCTIONAL DESCRIPTION (A)" FOR 45 ±5 YEARS OLD (FEMALE) | "FUNCTIONAL DESCRIPTION (B)" FOR 45 ±5 YEARS OLD (FEMALE) |
| "FUNCTIONAL DESCRIPTION (A)" FOR 50 ±5 YEARS OLD (FEMALE) | "FUNCTIONAL DESCRIPTION (B)" FOR 50 ±5 YEARS OLD (FEMALE) |
| "FUNCTIONAL DESCRIPTION (A)" FOR 55 ±5 YEARS OLD (FEMALE) | "FUNCTIONAL DESCRIPTION (B)" FOR 55 ±5 YEARS OLD (FEMALE) |
| "FUNCTIONAL DESCRIPTION (A)" FOR 60 ±5 YEARS OLD (FEMALE) | "FUNCTIONAL DESCRIPTION (B)" FOR 60 ±5 YEARS OLD (FEMALE) |
| "FUNCTIONAL DESCRIPTION (A)" FOR 65 ±5 YEARS OLD (FEMALE) | "FUNCTIONAL DESCRIPTION (B)" FOR 65 ±5 YEARS OLD (FEMALE) |
| "FUNCTIONAL DESCRIPTION (A)" FOR 70 ±5 YEARS OLD (FEMALE) | "FUNCTIONAL DESCRIPTION (B)" FOR 70 ±5 YEARS OLD (FEMALE) |
| "FUNCTIONAL DESCRIPTION (A)" FOR 75 ±5 YEARS OLD (FEMALE) | "FUNCTIONAL DESCRIPTION (B)" FOR 75 ±5 YEARS OLD (FEMALE) |
| "FUNCTIONAL DESCRIPTION (A)" FOR 80 ±5 YEARS OLD (FEMALE) | "FUNCTIONAL DESCRIPTION (B)" FOR 80 ±5 YEARS OLD (FEMALE) |
| "FUNCTIONAL DESCRIPTION (A)" FOR 5 ±5 YEARS OLD (MALE) | "FUNCTIONAL DESCRIPTION (B)" FOR 5 ±5 YEARS OLD (MALE) |
| "FUNCTIONAL DESCRIPTION (A)" FOR 10 ±5 YEARS OLD (MALE) | "FUNCTIONAL DESCRIPTION (B)" FOR 10 ±5 YEARS OLD (MALE) |
| "FUNCTIONAL DESCRIPTION (A)" FOR 15 ±5 YEARS OLD (MALE) | "FUNCTIONAL DESCRIPTION (B)" FOR 15 ±5 YEARS OLD (MALE) |
| "FUNCTIONAL DESCRIPTION (A)" FOR 20 ±5 YEARS OLD (MALE) | "FUNCTIONAL DESCRIPTION (B)" FOR 20 ±5 YEARS OLD (MALE) |
| "FUNCTIONAL DESCRIPTION (A)" FOR 25 ±5 YEARS OLD (MALE) | "FUNCTIONAL DESCRIPTION (B)" FOR 25 ±5 YEARS OLD (MALE) |
| "FUNCTIONAL DESCRIPTION (A)" FOR 30 ±5 YEARS OLD (MALE) | "FUNCTIONAL DESCRIPTION (B)" FOR 30 ±5 YEARS OLD (MALE) |
| "FUNCTIONAL DESCRIPTION (A)" FOR 35 ±5 YEARS OLD (MALE) | "FUNCTIONAL DESCRIPTION (B)" FOR 35 ±5 YEARS OLD (MALE) |
| "FUNCTIONAL DESCRIPTION (A)" FOR 40 ±5 YEARS OLD (MALE) | "FUNCTIONAL DESCRIPTION (B)" FOR 40 ±5 YEARS OLD (MALE) |
| "FUNCTIONAL DESCRIPTION (A)" FOR 45 ±5 YEARS OLD (MALE) | "FUNCTIONAL DESCRIPTION (B)" FOR 45 ±5 YEARS OLD (MALE) |
| "FUNCTIONAL DESCRIPTION (A)" FOR 50 ±5 YEARS OLD (MALE) | "FUNCTIONAL DESCRIPTION (B)" FOR 50 ±5 YEARS OLD (MALE) |
| "FUNCTIONAL DESCRIPTION (A)" FOR 55 ±5 YEARS OLD (MALE) | "FUNCTIONAL DESCRIPTION (B)" FOR 55 ±5 YEARS OLD (MALE) |
| "FUNCTIONAL DESCRIPTION (A)" FOR 60 ±5 YEARS OLD (MALE) | "FUNCTIONAL DESCRIPTION (B)" FOR 60 ±5 YEARS OLD (MALE) |
| "FUNCTIONAL DESCRIPTION (A)" FOR 65 ±5 YEARS OLD (MALE) | "FUNCTIONAL DESCRIPTION (B)" FOR 65 ±5 YEARS OLD (MALE) |
| "FUNCTIONAL DESCRIPTION (A)" FOR 70 ±5 YEARS OLD (MALE) | "FUNCTIONAL DESCRIPTION (B)" FOR 70 ±5 YEARS OLD (MALE) |
| "FUNCTIONAL DESCRIPTION (A)" FOR 75 ±5 YEARS OLD (MALE) | "FUNCTIONAL DESCRIPTION (B)" FOR 75 ±5 YEARS OLD (MALE) |
| "FUNCTIONAL DESCRIPTION (A)" FOR 80 ±5 YEARS OLD (MALE) | "FUNCTIONAL DESCRIPTION (B)" FOR 80 ±5 YEARS OLD (MALE) |

FIG. 6

INFORMATION PROCESSOR, CONTENT DETERMINING METHOD, AND COMPUTER-READABLE STORING MEDIUM

BACKGROUND OF THE INVENTION

1. Field of the Invention

The present invention relates to an information processor, a content determining method, and a computer-readable storing medium.

2. Description of the Related Art

An apparatus equipped with a video output device is conventionally known, which includes the video output device connected to a video supply device, a reflection member, and a screen. In this apparatus, output light, from the video output device, for projecting content is reflected by the reflection member, and the output light reflected by the reflection member is projected onto the screen which is formed in shape of the contour of the content, thereby giving improved impressions to the viewers (see, for example, Japanese Patent Application Laid-Open No. 2011-150221).

The output device according to the technology as described above, however, would output the content in an unsolicited manner; it would not be able to output content appropriate for a certain viewer.

A conceivable way of outputting content appropriate for a viewer would be, for example, to recognize a feature, such as the age or gender, of a viewer from an image of the viewer's face obtained by photographing the viewer, and to output content that is appropriate for the recognized feature. The result of recognition of a viewer's feature, however, involves a certain level of recognition error. There are cases where content inappropriate for the target viewer is output.

An object of the present invention is to prevent an undesirable situation where content inappropriate for a viewer is output due to a recognition error involved in recognition of a feature of the viewer.

SUMMARY OF THE INVENTION

To achieve the above object, an information processor as recited in claim 1 of the present invention includes: a recognition section that recognizes a feature of a viewer of content; an acquisition section that acquires a recognition error that occurs when the feature of the viewer is recognized by the recognition section; and a determination section that determines content to be output, on the basis of the acquired recognition error.

According to the present invention, it is possible to prevent such an undesirable situation where content inappropriate for a viewer is output due to a recognition error involved in recognition of a feature of the viewer.

BRIEF DESCRIPTION OF THE SEVERAL VIEWS OF THE DRAWING

FIGS. 5A and 5B show exemplary content data stored in a content storage unit.

DETAILED DESCRIPTION OF THE INVENTION

A suitable embodiment according to the present invention will be described below in detail with reference to the accompanying drawings. In the following embodiment, the case of applying the information processor according to the present invention to a digital signage device 1 will be described by way of example. It should be noted that the present invention is not limited to the illustrated case.

[Configuration of Digital Signage Device 1]

Figure 1:
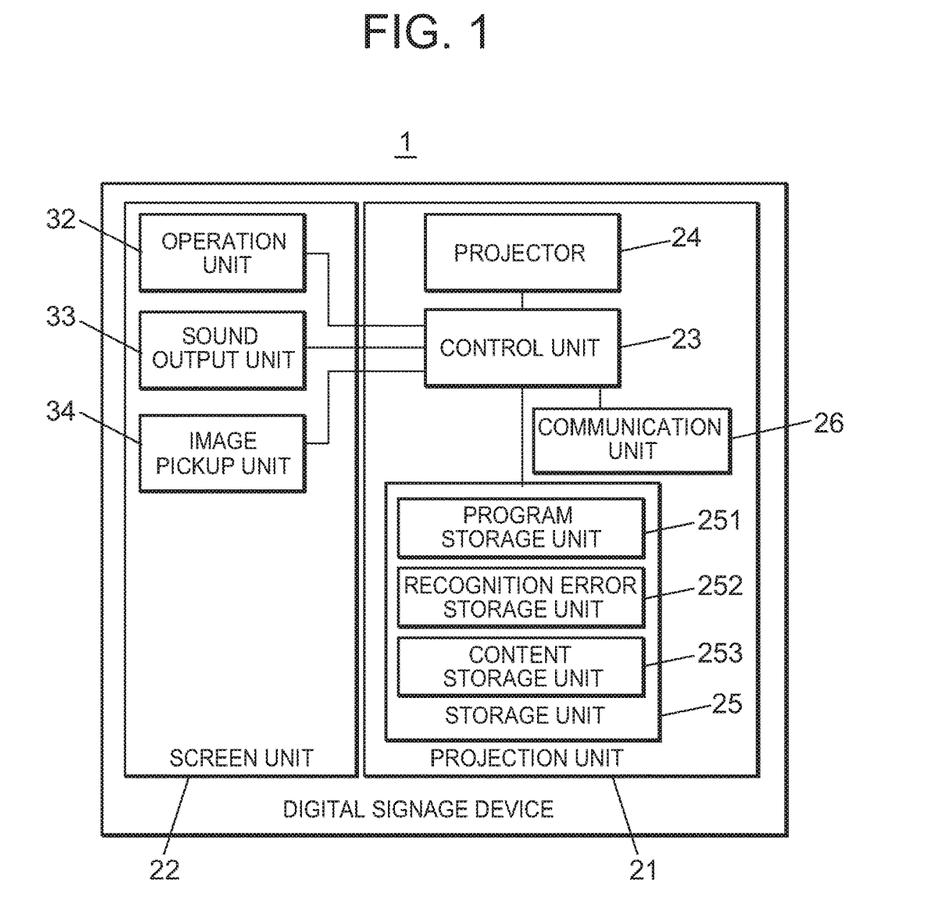
FIG. 1 is a block diagram showing the functional configuration of a digital signage device according to an embodiment of the present invention.
Figure 2:
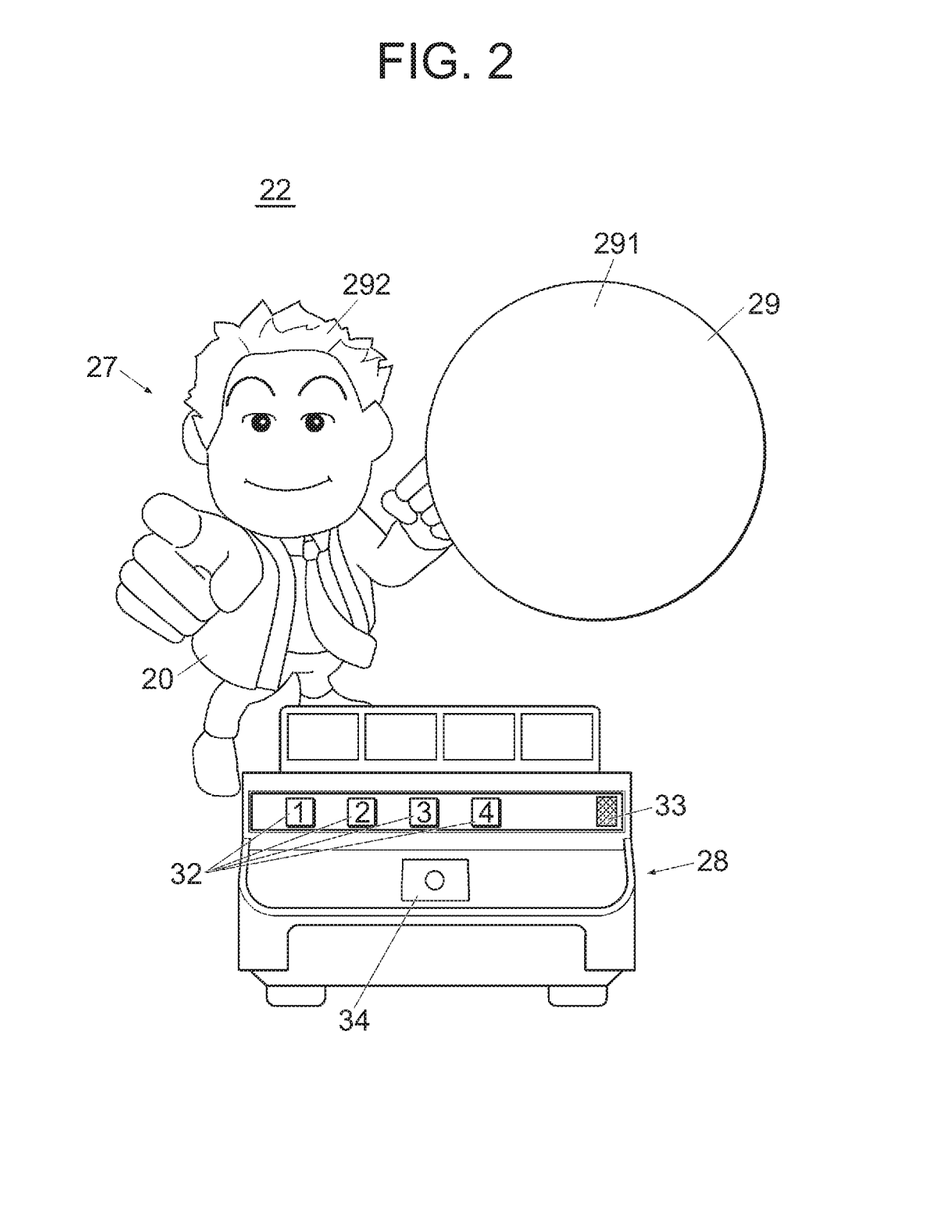
FIG. 2 shows a schematic configuration of the screen unit shown in FIG. 1.

FIG. 1 is a block diagram showing the major control configuration of the digital signage device 1. FIG. 2 is a front view showing the schematic configuration of a screen unit 22 in FIG. 1. The digital signage device 1 is, for example, a device which is installed in a retail store or the like and outputs content, such as description of goods, to a viewer (customer).

As shown in FIG. 1, the digital signage device 1 includes a projection unit 21 which emits video light of content, and the screen unit 22 which receives the video light emitted from the projection unit 21 on a rear face and projects the video light on a front face.

First, the projection unit 21 will be described.

The projection unit 21 includes a control unit 23, a projector 24, a storage unit 25, and a communication unit 26. The projector 24, the storage unit 25, and the communication unit 26 are connected to the control unit 23, as shown in FIG. 1.

The control unit 23 includes a central processing unit (CPU), which executes various programs stored in a program storage unit 251 in the storage unit 25 to perform prescribed computations and control various components and elements, and a memory used as a work area during execution of the programs. The CPU and the memory are not shown in the figure. The control unit 23 carries out content output processing, as will be described later, in cooperation with the programs stored in the program storage unit 251 in the storage unit 25. The control unit 23 functions as the recognition section, the acquisition section, and the determination section.

The projector 24 is a projection device which converts image data output from the control unit 23 into video light, and emits the resultant light toward the screen unit 22. As the projector 24, a DLP (registered trademark) (digital light processing) projector, for example, is applicable. The DLP projector utilizes a digital micromirror device (DMD) which is a display element in which a plurality of small mirrors are arranged in an array (horizontally 1024 pixels and vertically 768 pixels in the case of XGA), and the tilt angles of the individual mirrors are rapidly switched between the on and off states, to thereby form an optical image by the light reflected therefrom.

The storage unit 25 is configured with a hard disk drive (HDD), a non-volatile semiconductor memory, or the like. The storage unit 25 includes the program storage unit 251, as shown in FIG. 1. The program storage unit 251 stores a system program executed in the control unit 23, processing programs for executing various kinds of processing including the content output processing which will be described later, application programs such as a face recognition program (face recognition engine), gender/age recognition program (gender/age recognition engine) and the like, and data required for executing these programs.

The storage unit 25 further includes a recognition error storage unit 252 and a content storage unit 253.

The recognition error storage unit 252 stores data on how the gender recognition accuracy will vary and on how large the age recognition error will be, when the gender/age recognition program is executed by the control unit 23 to recognize the gender and age as features of a viewer on the basis of an image of the viewer picked up by an image pickup unit 34 (described later), depending on the distance between the image pickup unit 34 and the viewer.

Figure 3:
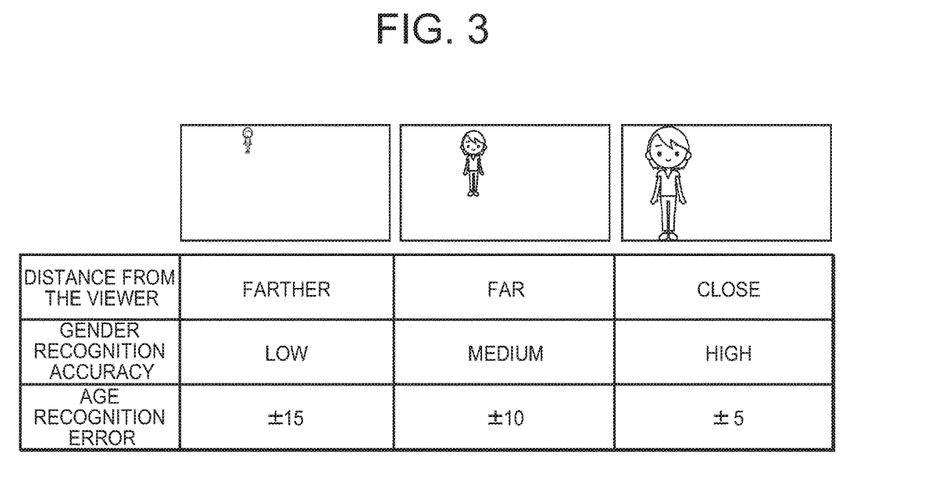
FIG. 3 shows, on the upper part, a change in size of a viewer within a picked-up image in accordance with a change in distance between an image pickup unit and the viewer, and shows, on the lower part, exemplary data stored in a recognition error storage unit.

The upper part in FIG. 3 shows a change in size of a viewer within a picked-up image in accordance with a change in distance between the image pickup unit 34 and the viewer. The lower part in FIG. 3 shows exemplary data stored in the recognition error storage unit 252. Each image in the upper part of FIG. 3 schematically illustrates the size of the viewer within the picked-up image when the distance between the image pickup device 34 and the viewer is the corresponding one in the lower part of FIG. 3.

In the recognition error storage unit 252, the distance between the image pickup device 34 and the viewer ("distance from the viewer") is stored, as shown in FIG. 3. In addition, the gender recognition accuracy and the age recognition error which are expected when a viewer's gender and age are recognized by executing the gender/age recognition program on an image picked up by the image pickup unit 34 when the viewer is at a certain distance are stored, with those accuracy and recognition error being associated with the corresponding distance. The data stored in the recognition error storage unit 252 are data which have been acquired by executing the gender/age recognition program to perform gender and age recognition in advance and pre-evaluating the recognition failures and recognition errors.

Here, in the table in FIG. 3, the "distance from the viewer" is classified into three levels of "farther", "far", and "close", which indicate that the eye-to-eye distance D of the viewer in a picked-up image falls within one of these predetermined ranges. The eye-to-eye distance D is a distance between two eyes of the viewer recognized from a picked-up image, and an approximate distance of the position of the viewer from the image pickup unit 34 can be specified from the eye-to-eye distance D. The eye-to-eye distance D decreases as the viewer is farther from the image pickup unit 34, while it increases as the viewer is closer to the image pickup unit 34. In the present embodiment, it is set such that, with 0<d1<d2, "farther" indicates D<d1, "far" indicates d1≤D<d2, and "close" indicates d2≤D.

The above-described three levels of the "distance from the viewer" correspond to the gender recognition accuracies and the age recognition errors by execution of the gender/age recognition program. Specifically, in the case where the "distance from the viewer" is "farther", the gender recognition accuracy by execution of the gender/age recognition program is low (for example, less than 50%) and the age recognition error is also large (for example, ±15 years). In the case of "far", the gender recognition accuracy by execution of the gender/age recognition program is medium (for example, 50% or more and less than 80%) and the age recognition error is also medium (for example, ±10 years). In the case of "close", the gender recognition accuracy by execution of the gender/age recognition program is high (for example, 80% or more) and the age recognition error is small (for example, ±5 years).

The content storage unit 253 stores content data of content that is output by an image forming unit 27 and a sound output unit 33 (both described later). The content data is made up of moving-image data configured with a plurality of frame images and sound data corresponding to the respective frame images.

Figure 4:
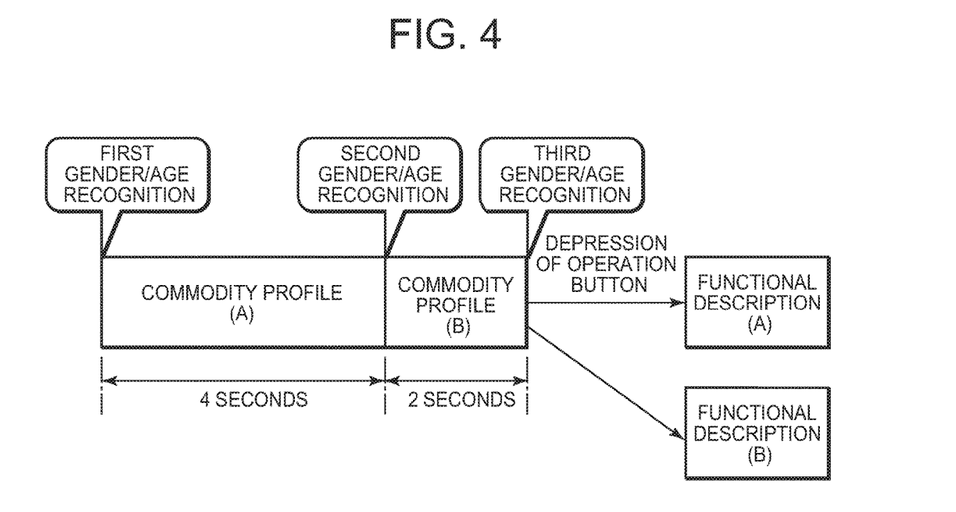
FIG. 4 shows exemplary content output by an image forming unit and a sound output unit.

FIG. 4 shows, by way of example, content that is output by the image forming unit 27 and the sound output unit 33. The content output in the present embodiment is content for advertising commodities, which has four parts of: "commodity profile A"; "commodity profile B"; "functional description A"; and "functional description B", as shown in FIG. 4.

The commodity profile A is content describing a rough profile of a commodity, which is reproduced (output) when a viewer is at a distance falling within the range of "farther" described above. The reproduction time of the content of the commodity profile A agrees with the time (here, four seconds) taken by a person to pass through the area corresponding to the range of "farther" as he/she walks at a normal walking speed. It is configured such that the content of the commodity profile A is reproduced, as a viewer approaches the digital signage device 1, while the viewer is passing through the area corresponding to the range of "farther".

The commodity profile B is content describing a little more detailed profile of a commodity, which is reproduced (output) when a viewer is at a distance falling within the range of "far" described above. The reproduction time of the content of the commodity profile B agrees with the time (here, two seconds) taken by a person to pass through the area corresponding to the range of "far" as he/she walks at a normal walking speed. It is configured such that the content of the commodity profile B is reproduced, as a viewer approaches the digital signage device 1, while the viewer is passing through the area corresponding to the range of "far".

The functional descriptions A and B are descriptions of functions of commodities, which are reproduced (output) when a viewer is at a distance falling within the range of "close" described above. The functional descriptions A and B can be reproduced (switched) in response to depression of an operation button in an operation unit 32 (described later).

Figure 5B:
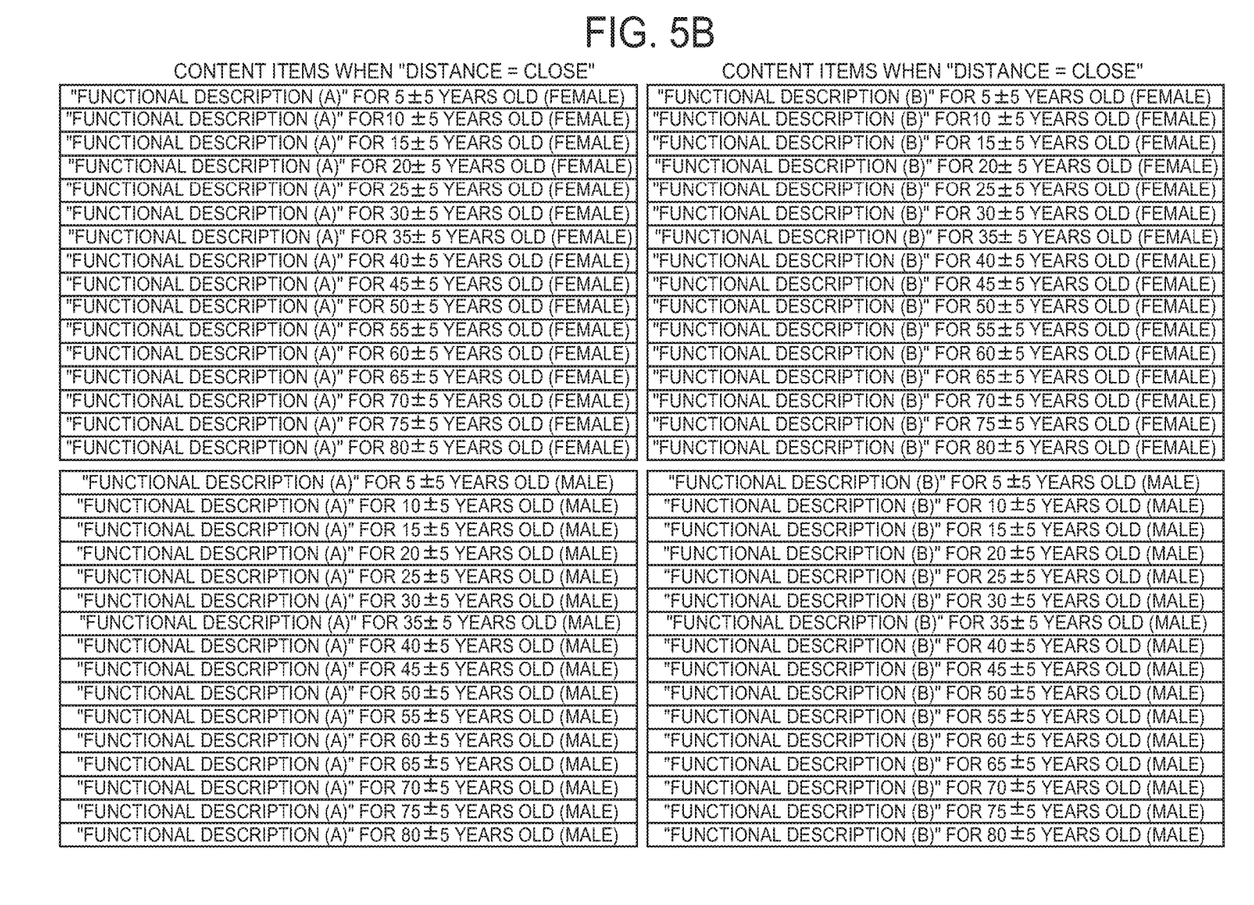

FIGS. 5A and 5B show, by way of example, data of content items stored in the content storage unit 253.

In the case where the gender and age of a viewer who is at a distance falling within the range of "farther" described above are recognized by execution of the gender/age recognition program, the gender recognition accuracy is low and the age recognition error is ±15 years, as shown in FIG. 3. Thus, in consideration of the possibilities that such recognition errors may take place for viewers within the area corresponding to the range of "farther", content items (here, content items of "commodity profiles A") which are suitable for both genders and appropriate for the age groups within the range of ±15 years from the recognized ages are stored in the content storage unit 253, as shown in FIGS. 5A and 5B.

In the case where the gender and age of a viewer who is at a distance falling within the range of "far" described above are recognized by execution of the gender/age recognition program, the gender recognition accuracy is medium (for example, 50% or more) and the age recognition error is ±10 years, as shown in FIG. 3. Thus, in consideration of the possibilities that such recognition errors may take place for viewers within the area corresponding to the range of "far", content items (here, content items of "commodity profiles B") which are suitable for either gender and appropriate for the age groups within the range of ±10 years from the recognized ages are stored in the content storage unit 253, as shown in FIGS. 5A and 5B.

In the case where the gender and age of a viewer who is at a distance falling within the range of "close" described above are recognized by execution of the gender/age recognition program, the gender recognition accuracy is high (for example, 80% or more) and the age recognition error is ±5 years, as shown in FIG. 3. Thus, in consideration of the possibilities that such recognition errors may take place for viewers within the area corresponding to the range of "close", content items (here, content items of "functional descriptions A, B") which are suitable for either gender and appropriate for the age groups within the range of ±5 years from the recognized ages are stored in the content storage unit 253, as shown in FIGS. 5A and 5B.

Further, content data of content items for general use (referred to as "general-purpose content" items) which are appropriate for both genders and all ages are also stored in the content storage unit 253.

Returning to FIG. 1, the communication unit 26 includes a modem, router, network card, and the like, and performs communication with external equipment connected to a communication network such as a LAN.

The screen unit 22 will now be described.

As shown in FIG. 2, the screen unit 22 includes the image forming unit 27, and a base unit 28 which supports the image forming unit 27.

The image forming unit 27 is a screen which has a light-transmitting plate 29 of an acrylic plate, for example, formed into a human shape and arranged in a direction approximately orthogonal to the video light emitting direction. A film screen 291 for rear projection, having a film-type Fresnel lens laminated, and a pre-printed film 292 are adhered to the plate 29. The projector 24 projects an image onto an area of the image forming unit 27 where the film screen 291 is adhered. This image forming unit 27 and the projector 24 described above constitute an output section.

The base unit 28 includes the button-type operation unit 32, the sound output unit 33, such as a speaker, for outputting sound, and the image pickup unit 34.

The operation unit 32 includes various operation buttons, and detects and outputs an operation button depression signal to the control unit 23. Depressing an operation button makes it possible, for example, to switch the category of the content to be output.

The image pickup unit 34 is a unit for picking up an image by photographing a space in front of the digital signage device 1. Although not shown in the figure, the image pickup unit 34 includes a camera having an optical system and an image pickup element, and an image pickup control unit controlling the camera.

The optical system of the camera faces the direction capable of photographing a viewer in front of the digital signage device 1. The image pickup element is, for example, a charge coupled device (CCD) or complementary metal-oxide semiconductor (CMOS) image sensor. The image pickup element converts the optical image that has passed through the optical system, to a two-dimensional image signal.

The operation unit 32, the sound output unit 33, and the image pickup unit 34 are connected to the control unit 23, as shown in FIG. 1.

[Operation of Digital Signage Device 1]

An operation of the digital signage device 1 will now be described.

Figure 6:
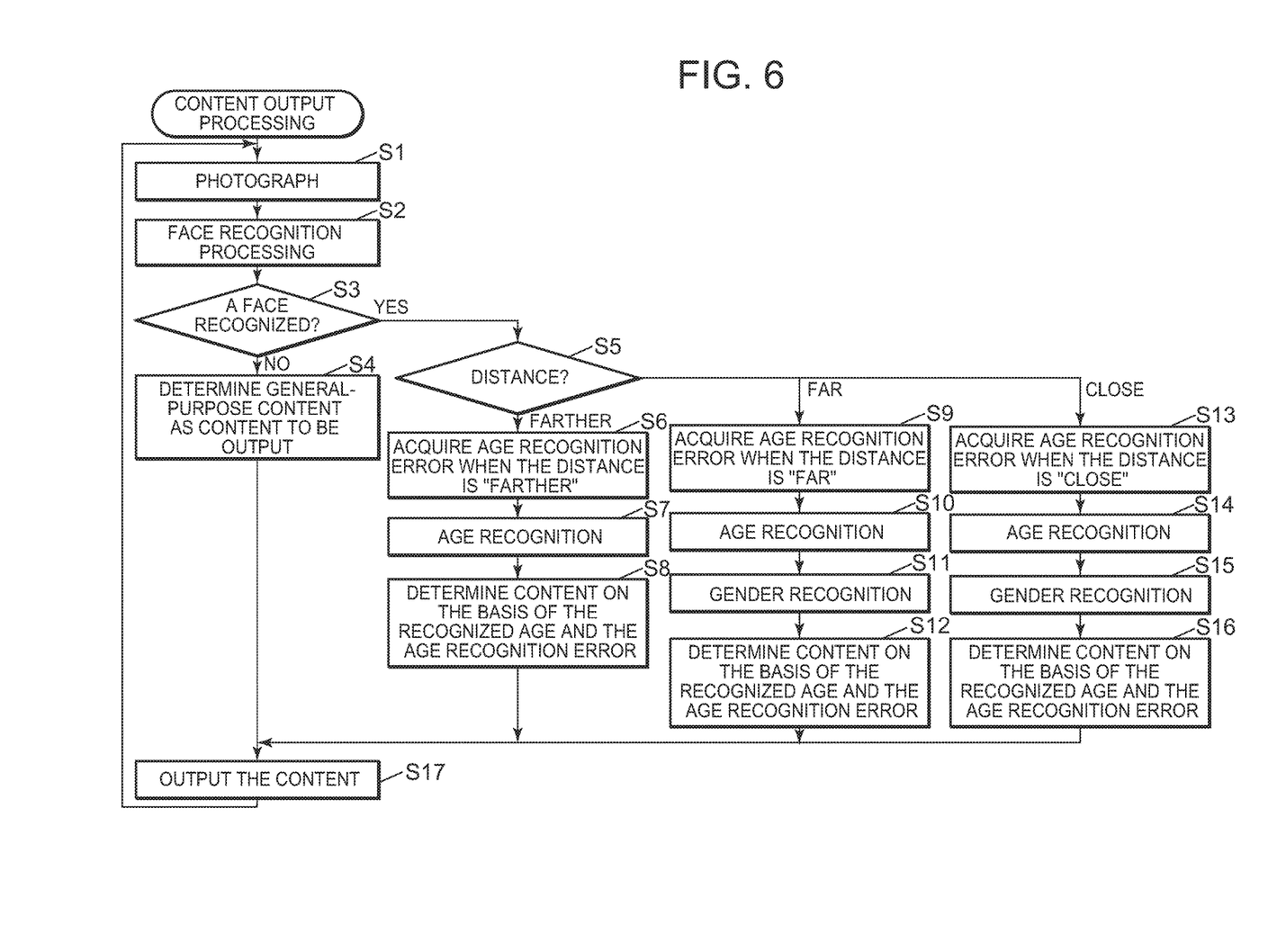
FIG. 6 is a flowchart illustrating content output processing carried out by the control unit shown in FIG. 1.

FIG. 6 is a flowchart illustrating the content output processing carried out in the digital signage device 1. The content output processing is carried out, when the digital signage device 1 is turned ON, by the cooperation of the control unit 23 and the program stored in the program storage unit 251.

First, the control unit 23 causes the image pickup unit 34 to photograph, thereby acquiring a picked-up image (step S1).

Next, the control unit 23 reads out a face recognition program, and performs face recognition processing on the picked-up image acquired in step S1 (step S2). The face recognition technique is not particularly limited; any known image processing technology such as the technique using the Haar-like features, as described in Japanese Patent Application Laid-Open No. 2012-053813, for example, may be adopted.

Next, the control unit 23 determines whether a face has been recognized as a result of the face recognition processing (step S3). If it is determined that no face was recognized (NO in step S3), the control unit 23 determines general-purpose content as the content to be output (step S4). The control unit 23 causes the image forming unit 27 and the sound output unit 33 to output the content (step S17). Specifically, the control unit 23 reads from the content storage unit 253 the content data of the content to be output, and outputs the frame images successively to the projector 24, to thereby cause the projector 24 to project the images onto the image forming unit 27. The control unit 23 also outputs the read sound data to the sound output unit 33, to thereby cause it to output the sound of the content.

On the other hand, if it is determined that a face was recognized as a result of the face recognition processing (YES in step S3), the control unit 23 regards the face recognized from the picked-up image as the face of a viewer, and determines the distance between the image pickup unit 34 and the viewer on the basis of the face image (step S5). Specifically, the control unit 23 calculates the distance between the two eyes in the face image recognized from the picked-up image to acquire the eye-to-eye distance D, and uses the acquired eye-to-eye distance D to determine into which one of "farther", "far", and "close" the distance between the image pickup unit 34 and the viewer is classified. If more than one face is recognized, the processing in step S5 and on may be performed on, for example, a face image of the face that is largest in size.

If it is determined in step S5 that the distance between the image pickup unit 34 and the viewer is "farther" ("farther" in step S5), the control unit 23 refers to the recognition error storage unit 252 to acquire the information on the age recognition error corresponding to the case where the distance from the viewer is "farther" (step S6).

Next, the control unit 23 executes the gender/age recognition program to recognize the age of the viewer on the basis of the face image recognized in step S2 (step S7). The age recognition technique is not particularly limited; any known image processing technology such as the technique of recognizing the age on the basis of the wrinkle feature amount, spot feature amount, and lip feature amount in the face area, as described in Japanese Patent Application Laid-Open No. 2012-053813, or the technique of recognizing the age on the basis of the contour of the face, the positions of the eyes, nose, mouth and other parts, the skin conditions and the like extracted from a face image, for example, may be adopted.

The control unit 23 then determines content to be output, on the basis of the age of the viewer recognized by executing the gender/age recognition program and the age recognition error acquired in step S6 (step S8), and the process proceeds to step S17. In step S8, of the content items stored in the content storage unit 253, one content item that is suitable for the age group of the recognized age ±15 years is determined as the content to be output.

If it is determined in step S5 that the distance between the image pickup unit 34 and the viewer is "far" ("far" in step S5), the control unit 23 refers to the recognition error storage unit 252 to acquire the information on the age recognition error corresponding to the case where the distance from the viewer is "far" (step S9).

Next, the control unit 23 executes the gender/age recognition program to recognize the age of the viewer on the basis of the face image recognized in step S2 (step S10).

Next, the control unit 23 executes the gender/age recognition program to recognize the gender of the viewer on the basis of the face image recognized in step S2 (step S11). The gender recognition technique is not particularly limited; any known image processing technology such as the technique of recognizing the gender on the basis of the wrinkle feature amount, spot feature amount, and lip feature amount in the face area, as described in Japanese Patent Application Laid-Open No. 2012-053813, or the technique of estimating the gender on the basis of face feature amounts such as the positions, sizes, and ratios of the eyes, nose, hair style, color, etc. included in a face image, for example, may be adopted.

The control unit 23 then determines content to be output, on the basis of the gender and age of the viewer recognized by executing the gender/age recognition program and the age recognition error acquired in step S9 (step S12), and the process proceeds to step S17. In step S12, of the content items stored in the content storage unit 253, one content item that is suitable for the recognized gender and suitable for the age group of the recognized age ±10 years is determined as the content to be output.

If it is determined in step S5 that the distance between the image pickup unit 34 and the viewer is "close" ("close" in step S5), the control unit 23 refers to the recognition error storage unit 252 to acquire the information on the age recognition error corresponding to the case where the distance from the viewer is "close" (step S13).

Next, the control unit 23 executes the gender/age recognition program to recognize the age of the viewer on the basis of the face image recognized in step S2 (step S14).

Next, the control unit 23 executes the gender/age recognition program to recognize the gender of the viewer on the basis of the face image recognized in step S2 (step S15).

The control unit 23 then determines content to be output, on the basis of the gender and age of the viewer recognized by executing the gender/age recognition program and the age recognition error acquired in step S13 (step S16), and the process proceeds to step S17. In step S16, of the content items stored in the content storage unit 253, one content item that is suitable for the recognized gender and suitable for the age group of the recognized age ±5 years is determined as the content to be output.

In step S17, the control unit 23 causes the image forming unit 27 and the sound output unit 33 to output the content that has been determined to be output. Specifically, the control unit 23 reads from the content storage unit 253 the content data of the content to be output, and outputs the frame images successively to the projector 24, to thereby cause the projector 24 to project the images onto the image forming unit 27. The control unit 23 also outputs the read sound data to the sound output unit 33, to thereby cause it to output the sound of the content.

The control unit 23 repeats the processing in steps S1 to S17 while the digital signage device 1 is ON.

For example, in the case where a 25-year-old female viewer is at a distance falling within the range of "farther" described above, she may be erroneously recognized as a 40-year-old man due to the poor gender and age recognition accuracies. In this case, if content appropriate for a 40-year-old man is just output, it is highly likely that the viewer is not interested in that content inappropriate for the viewer and moves away from the digital signage device 1. In the present embodiment, however, the content suitable for both genders and for 40±15 years old is output, as indicated by hatching in FIG. 5A, allowing content appropriate for the viewer to be output. That is, even in the occurrence of false recognition of the gender and/or age, the content taking account of such false recognition is output, preventing the undesirable situation where content inappropriate for a viewer is output. As the viewer approaches the digital signage device 1, the gender and age recognition accuracies increase. It is therefore possible to output content focusing on the gender and age of the viewer as the viewer approaches the digital signage device 1.

As described above, according to the digital signage device 1, the control unit 23 acquires the distance between the image pickup unit 34 and a viewer, and acquires the recognition error of a feature of the viewer that occurs when the feature of the viewer is recognized from a picked-up image acquired by the image pickup unit 34 when the viewer is at that distance. The control unit 23 then determines content to be output, on the basis of the acquired recognition error and the recognized feature of the viewer. For example, the control unit 23 determines, as the content to be output, content that is proper for the age group within the range of the recognition error from the recognized age of the viewer.

It is therefore possible to prevent the undesirable situation where content inappropriate for the viewer is output due to the occurrence of recognition error of the feature of the viewer.

It should be noted that the description of the above embodiment is a suitable example of the digital signage device of the present invention; the present invention is not limited thereto.

For example, in the above embodiment, the distance between the image pickup unit 34 and the viewer was acquired on the basis of the eye-to-eye distance D in the face image recognized from the picked-up image. The way of acquiring the distance, however, is not limited thereto; it may be acquired on the basis of the size of the face recognized from the picked-up image, for example.

Further, in the above embodiment, the content to be output was determined on the basis of the feature of the viewer recognized by executing the gender/age recognition program and the recognition error that occurs in the case of recognizing the feature of the viewer. The content to be output, however, may be determined on the basis of the recognition error alone, without recognizing the feature of the viewer. For example, in the case where the distance between the image pickup unit 34 and the viewer is farther, i.e. when the age recognition error exceeds a predetermined reference level, general-purpose content may be determined as the content to be output. In the case where the age recognition error does not exceed the predetermined reference level, the gender/age recognition program may be executed to acquire the gender and age of the viewer, and the content based on the recognized gender and age may be determined as the content to be output.

In the above embodiment, a single program was used to estimate the gender and the age on the basis of a picked-up image (face image). Alternatively, separate programs may be used for estimating the gender and for estimating the age.

Further, in the above embodiment, the content was a moving image (with sound). The content, however, is not limited thereto; it may include images alone, or it may include sound alone.

Furthermore, in the above embodiment, the distance was detected on the basis of the eye-to-eye distance D. The way of detecting the distance, however, is not limited thereto; a distance measurement sensor or the like may be used to detect the distance.

In the above embodiment, the case of applying the present invention to the digital signage device which displays an image by projecting the image from the projector onto the screen was explained. The application of the present invention, however, is not limited thereto; it may be applied to an information processor having a liquid crystal display, plasma display, or other display device, or to an information processor connected to such a display device. In either case, similar effects as described above can be obtained.

The other detailed configurations and detailed operations of the digital signage device may be modified as appropriate within the range not departing from the gist of the invention.

While several embodiments of the present invention have been described, the scope of the present invention is not limited to the embodiments described above; rather, it includes the scope as recited in the claims and equivalent thereof.

What is claimed is:

1. An information processing apparatus comprising:
   a hardware processor configured to:
   acquire, in real time, a picked-up image of a viewer of content being outputted by an output unit, while the content is being outputted by the output unit and the viewer is viewing the content;
   recognize a feature of the viewer based on the picked-up image;
   determine a distance between the viewer and an image pickup section, based on the picked-up image;
   acquire a range of a recognition error based on the distance between the image pickup section and the viewer, the recognition error being an error that occurs when the feature of the viewer is recognized; and
   determine content to be output, from among a plurality of contents stored in a memory, based on the acquired range of the recognition error and the recognized feature of the viewer, each of the plurality of contents being stored in the memory in association with a respective range of a recognition error and a respective feature of a viewer.

2. The information processing apparatus according to claim 1, wherein the hardware processor is configured to perform face recognition processing on the picked-up image, and to recognize the feature of the viewer based on an image of a face recognized in the face recognition processing.

3. The information processing apparatus according to claim 1, wherein the range of the recognition error is larger as the distance between the image pickup section and the viewer is farther, and the range of the recognition error is smaller as the distance between the image pickup section and the viewer is closer.

4. The information processing apparatus according to claim 1, wherein the recognized feature of the viewer includes an age of the viewer, and
   wherein the hardware processor is configured to:
   determine, as the content to be output, content that corresponds to an age group within the acquired range of the recognition error which includes the age of the viewer recognized as the recognized feature of the viewer.

5. The information processing apparatus according to claim 2, wherein the recognized feature of the viewer includes an age of the viewer, and
   wherein the hardware processor is configured to:
   determine, as the content to be output, content that corresponds to an age group within the acquired range of the recognition error which includes the age of the viewer recognized as the recognized feature of the viewer.

6. The information processing apparatus according to claim 3, wherein the recognized feature of the viewer includes an age of the viewer, and
   wherein the hardware processor is configured to:
   determine, as the content to be output, content that corresponds to an age group within the acquired range of the recognition error which includes the age of the viewer recognized as the recognized feature of the viewer.

7. A content determining method for determining content by controlling an information processing apparatus, the method comprising:
   acquiring, in real time, a picked-up image of a viewer of content being outputted by an output unit, while the content is being outputted by the output unit and the viewer is viewing the content;
   recognizing a feature of the viewer based on the picked-up image;
   determining a distance between the viewer and an image pickup section, based on the picked-up image;
   acquiring a range of a recognition error based on the distance between the image pickup section and the viewer, the recognition error being an error that occurs when the feature of the viewer is recognized; and
   determining content to be output, from among a plurality of contents stored in a memory, based on the acquired range of the recognition error and the recognized feature of the viewer, each of the plurality of contents being stored in the memory in association with a respective range of a recognition error and a respective feature of a viewer.

8. A non-transitory computer-readable storage medium having a program stored thereon which is executable by a hardware processor of an information processing apparatus to control the hardware processor to:
   acquire, in real time, a picked-up image of a viewer of content being outputted by an output unit, while the content is being outputted by the output unit and the viewer is viewing the content;
   recognize a feature of the viewer based on the picked-up image;
   determine a distance between the viewer and an image pickup section, based on the picked-up image;
   acquire a range of a recognition error based on the distance between the image pickup section and the viewer, the recognition error being an error that occurs when the feature of the viewer is recognized; and
   determine content to be output, from among a plurality of contents stored in a memory, based on the acquired range of the recognition error and the recognized feature of the viewer, each of the plurality of contents being stored in the memory in association with a respective range of a recognition error and a respective feature of a viewer.

\* \* \* \* \*